(12) United States Patent
Yokomoto et al.

(10) Patent No.: US 8,622,297 B1
(45) Date of Patent: Jan. 7, 2014

(54) CARD READER ANTI-SKIMMING ASSEMBLY AND METHOD

(75) Inventors: Randy Yokomoto, Torrance, CA (US); Ian Kidman, Newbury Park, CA (US); Nhut Trung Ha, Burbank, CA (US); Joseph Butryn, Redondo Beach, CA (US)

(73) Assignee: Citigroup Technology, Inc., New York, NY (US)

( * ) Notice: Subject to any disclaimer, the term of this patent is extended or adjusted under 35 U.S.C. 154(b) by 0 days.

(21) Appl. No.: 13/470,977

(22) Filed: May 14, 2012

(51) Int. Cl.
| G06K 7/08 | (2006.01) |
| G06F 17/00 | (2006.01) |
| G06K 5/00 | (2006.01) |
| G06K 7/00 | (2006.01) |
| G06K 13/24 | (2006.01) |

(52) U.S. Cl.
USPC .......... 235/449; 235/375; 235/379; 235/380; 235/435; 235/439; 235/475; 235/482; 235/483; 235/486; 109/8

(58) Field of Classification Search
USPC .............. 235/379, 380, 382, 382.5, 435, 439, 235/449, 475, 482, 483, 486; 109/8
See application file for complete search history.

(56) References Cited

U.S. PATENT DOCUMENTS

| 4,585,929 | A | * | 4/1986 | Brown et al. ................. 235/449 |
| 4,717,816 | A | * | 1/1988 | Raymond et al. .......... 235/382.5 |
| 4,863,397 | A | * | 9/1989 | Hatch, Jr. ....................... 439/475 |
| 5,933,085 | A | * | 8/1999 | Holcomb et al. ............ 340/5.66 |
| 6,357,657 | B1 | | 3/2002 | May |
| 7,068,162 | B2 | * | 6/2006 | Maple et al. ............. 340/539.11 |
| 7,777,325 | B2 | * | 8/2010 | Yamada ........................ 257/690 |
| 7,810,734 | B2 | * | 10/2010 | Rakoff et al. ................. 235/475 |
| 7,825,811 | B2 | * | 11/2010 | Chan et al. ................. 340/572.9 |
| 8,109,780 | B2 | | 2/2012 | Addison et al. |
| 8,240,566 | B1 | * | 8/2012 | Criscitiello ................... 235/439 |
| 2006/0096338 | A1 | * | 5/2006 | Jasper ................................ 70/92 |
| 2007/0040023 | A1 | * | 2/2007 | Ruggirello et al. ........... 235/382 |
| 2009/0050699 | A1 | | 2/2009 | Basar et al. |
| 2011/0152911 | A1 | * | 6/2011 | Godoy et al. ................. 606/186 |
| 2011/0238581 | A1 | * | 9/2011 | Severson et al. ................ 705/67 |
| 2012/0080518 | A1 | * | 4/2012 | Van Den Bogart et al. .. 235/379 |
| 2013/0037614 | A1 | * | 2/2013 | Criscitiello ................... 235/449 |

FOREIGN PATENT DOCUMENTS

| GB | 2421300 A | 6/2006 |
| JP | 2010170379 A | 8/2010 |
| KR | 2011127424 A | 11/2011 |
| WO | WO 2011/096507 A1 | 8/2011 |

* cited by examiner

*Primary Examiner* — Thien M Le
*Assistant Examiner* — Claude J Brown
(74) *Attorney, Agent, or Firm* — John M. Harrington, Esq.; Johnson, Marcou & Isaacs, LLC

(57) ABSTRACT

An anti-skimming assembly for a card reader device includes, for example, a displacement bar mountable on a front plate of a card reader device proximate a card entry opening formed in the front plate, which displacement bar has first and second legs. The displacement bar is mountable on the front plate with the first leg aligned with an internal read head inside the card entry opening of the card reader device. An infrangible fastener is connectible to the first leg through a first fastener opening formed in the front plate, and a non-conductive frangible or breakable fastener is connectible to the second leg through a second fastener opening formed in the front plate. In addition, first and second electrically conductive leads are carried by the non-conductive frangible fastener electrically connected to one another via an electrically conductive spring and connectible to an alarm circuit.

4 Claims, 3 Drawing Sheets

CARD READER ANTI-SKIMMING ASSEMBLY AND METHOD

FIELD OF THE INVENTION

The present invention relates generally to the field of magnetic stripe cards and more particularly to an anti-skimming assembly and method for a magnetic stripe card reader device.

BACKGROUND

The magnetic stripe of a magnetic stripe bankcard may read by a magnetic read head of a card reader, for example, of an automated teller machine (ATM) to enable the cardholder to perform an ATM transaction. The card reader captures the cardholder's account and related information recorded on the magnetic stripe, which may be sent to a host processor coupled to the ATM. The host processor may use such information to route the transaction to the cardholder's bank. An ATM keypad may let the cardholder enter a personal identification number (PIN) and information about the transaction which the cardholder wishes to perform.

In addition, magnetic stripe card readers may be deployed to control access to areas, such as ATM lobbies or vestibules, that are provided with doors secured by electric locks. Such electric door locks may be unlocked, for example, by inserting or swiping a properly encoded magnetic stripe card at the card reader. Such deployments are referred to herein as "access control card readers" (ACCRs). If the proper credentials are encoded on the magnetic stripe, a signal may be sent to the electric door lock to unlock the door and admit the cardholder.

In recent years, huge economic losses have been incurred as a result of the theft and fraudulent use by criminals of cardholders' credentials recorded on the magnetic stripe of their bankcards. One way in which such theft occurs is a criminal practice referred to as "skimming" of bankcard information when a magnetic stripe bankcard is used by a cardholder, for example, in an otherwise legitimate transaction at an ATM or for access at an ACCR of an ATM vestibule or lobby.

A major problem of skimming involves criminals putting a device with a skimming read head, such as an overlay, over a card slot of an ATM or ACCR which reads the magnetic stripe as the cardholder unknowingly passes his or her bankcard through the card slot to be read by the internal read head of the ATM or ACCR. The skimming read head reads the same bankcard information that is read by the ATM or ACCR read head and records or sends the information to the criminals.

Skimming overlays may also include a keypad overlay that matches up with buttons on the legitimate keypad beneath the overlay and records and sends the cardholders' PINs to the criminals. Regardless of the skimming technique used, it is important to criminal skimmers to make sure that the device at which their skimming activity occurs, such as an ATM or ACCR, continues to work normally so that cardholders are unaware that their bankcards are being illegally recorded.

There is a present need for devices and methods that avoid exposing a cardholder's account information to potential theft by skimmers when the cardholder uses his or her magnetic stripe card at an ATM in a financial transaction or at an ACCR to access a locked premises, such as a bank branch or an ATM vestibule or lobby.

SUMMARY OF THE INVENTION

Embodiments of the invention provide an anti-skimming assembly for a card reader device consisting, for example, of a displacement bar mountable on a front plate of a card reader device proximate a card entry opening formed in the front plate, which displacement bar has first and second legs. An infrangible or unbreakable fastener is connectible to the first leg through a first fastener opening formed in the front plate, and a non-conductive frangible or breakable fastener is connectible to the second leg through a second fastener opening formed in the front plate. In addition, first and second electrically conductive leads are carried by the non-conductive frangible fastener electrically connected to one another via an electrically conductive spring and connectible to an alarm circuit.

In aspects of embodiments of the invention, the displacement bar may be mountable on the front plate with the first leg proximate the card entry opening of the card reader device. In other aspects, the displacement bar may be mountable on the front plate with the first leg aligned with an internal read head inside the card entry opening of the card reader device. In further aspects, the displacement bar may be mountable on the front plate with the first leg proximate an entry path of a magnetic stripe of a magnetic stripe card into the card entry opening of the card reader device. In additional aspects, the displacement bar may have a U shape.

In further aspects of embodiments of the invention, the infrangible fastener may be, for example, a metal fastener, such as a steel fastener. In other aspects, the infrangible fastener be, for example, a threaded metal screw receivable in an internally threaded opening formed in the first leg. In additional aspects, the frangible fastener may be, for example, a non-metallic fastener. In still other aspects, the frangible fastener may be, for example, a nylon fastener. In still further aspects, the frangible fastener may be, for example, a non-metallic threaded screw receivable in an internally threaded opening formed in the second leg.

In additional aspects of embodiments of the invention, the first and second electrically conductive leads may be, for example, first and second ring terminal connectors of first and second cables, respectively, which first and second cables are connectible to the alarm circuit. In other aspects, the electrically conductive spring may be, for example, an electrically conductive compression spring carried by the non-conductive frangible fastener between the two rings of the ring terminal connectors. In further aspects, the electrically conductive compression spring may be carried by the non-conductive frangible fastener in a compressed condition between the two rings of the ring terminal connectors.

Other embodiments of the invention provide an anti-skimming method for a card reader device, that may involve, for example, providing a displacement bar mountable on a front plate of a card reader device proximate a card entry opening formed in the front plate, which displacement bar has first and second legs. An infrangible fastener is connected to the first leg through a first fastener opening formed in the front plate, and a non-conductive frangible fastener is connected to the second leg through a second fastener opening formed in the front plate, which non-conductive frangible fastener carries first and second electrically conductive alarm circuit leads electrically connected to one another via an electrically conductive spring.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Figure 1:
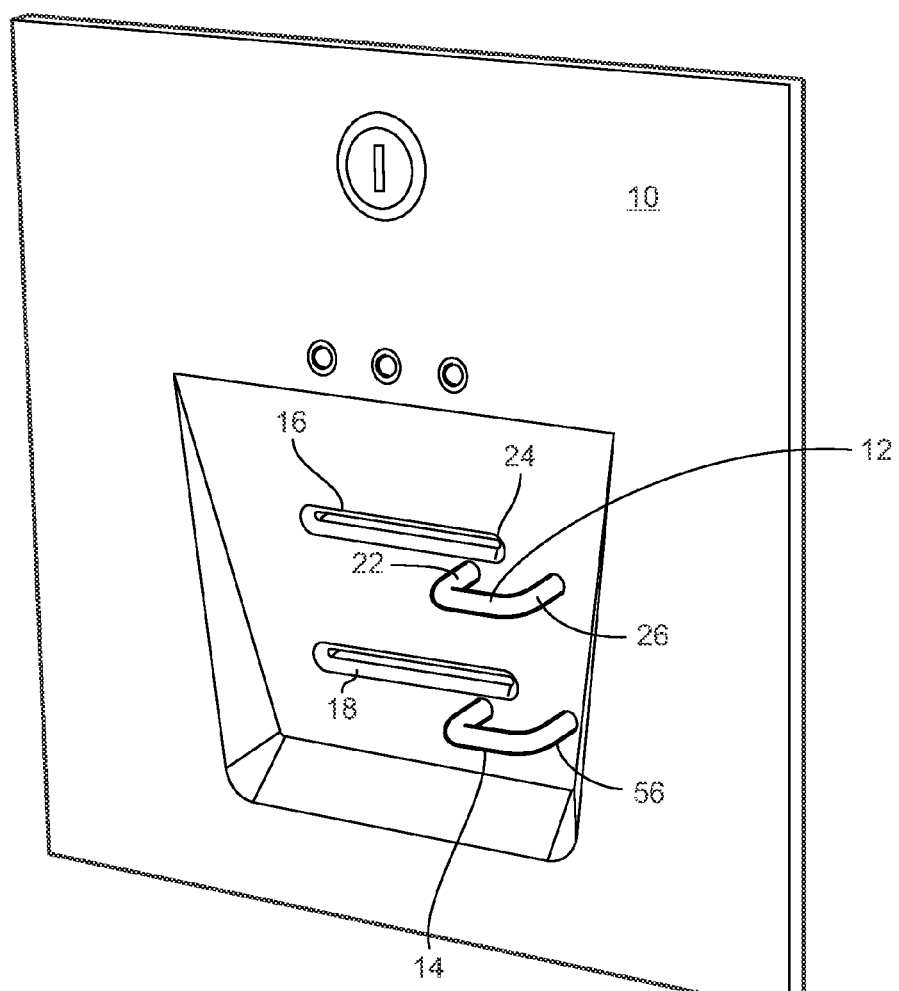
FIG. 1 is a front perspective view of an example of a front panel of a card reader device, such as an ACCR, with anti-skimming displacement bars for embodiments of the invention mounted on the front panel.

FIG. 1 is a front perspective view of an example of a front panel 10 of an ACCR with anti-skimming displacement bars 12, 14 for embodiments of the invention mounted on the front panel 10. It is to be understood that deployment of the anti-skimming displacement bar assembly for embodiments of the invention is not limited to ACCRs but may include deployment on any device that employs a magnetic stripe card reader device, such as an ATM.

It is to be further understood that while two card entry openings 16, 18 may be provided on the front plate 10 as a matter of convenience as illustrated in FIG. 1, embodiments of the invention are likewise not limited to deployment on a front panel of a device having any particular number of card entry openings but may include devices having only one card entry opening or any other number of card entry openings.

In addition, while the card entry openings 16, 18 are depicted in FIG. 1 in a stacked, horizontal arrangement on the face plate 10, it is to be understood that such arrangement is a matter of choice and that embodiments of the invention may be deployed on panels having card entry openings in a vertical arrangement or in any other arrangement on the front plate.

Referring to FIG. 1, the anti-skimming displacement bar assembly for embodiments of the invention may employ one or more displacement bars 12, 14, each of which may be U-shaped and mountable on the front panel 10 of an ATM or ACCR. However, it is to be understood that the anti-skimming displacement bar for embodiments of the invention, such as displacement bars 12, 14, is not limited to having a U shape but may have any other suitable shape.

A consideration in determining a particular shape, such as the U shape, and a particular size, such as diameter of approximately three-sixteenths inch, of each anti-skimming displacement bar 12, 14 may be that the particular size and shape that is selected is not remotely similar in appearance to any known skimming device which may by be likely to alarm customers and lead them to avoid ATMs or ACCRs on which the displacement bars 12, 14 may be deployed. Further, the U-shaped displacement bars 12, 14 may not have an outward appearance to customers, for example, of containing any electronic components that might be capable of skimming.

A significant consideration in determining the particular shape and height of the displacement bars 12, 14 for embodiments of the invention may be that in order for a criminal to apply a skimmer head on the front plate 10 of the ATM or ACCR, it would be necessary for the criminal to design a skimmer overlay that somehow clears one or both of the displacement bars 12, 14. For example, if a criminal attempted to place a skimmer overlay on the front panel 10 of an ATM or ACCR with one or both of the displacement bars 12, 14 deployed, the presence of such a skimmer overlay would be obvious to a customer, since it would necessarily have a strange, out-of-place looking protrusion extending from the front plate 10 in the vicinity of each of card slots 16, 18.

Figure 2:
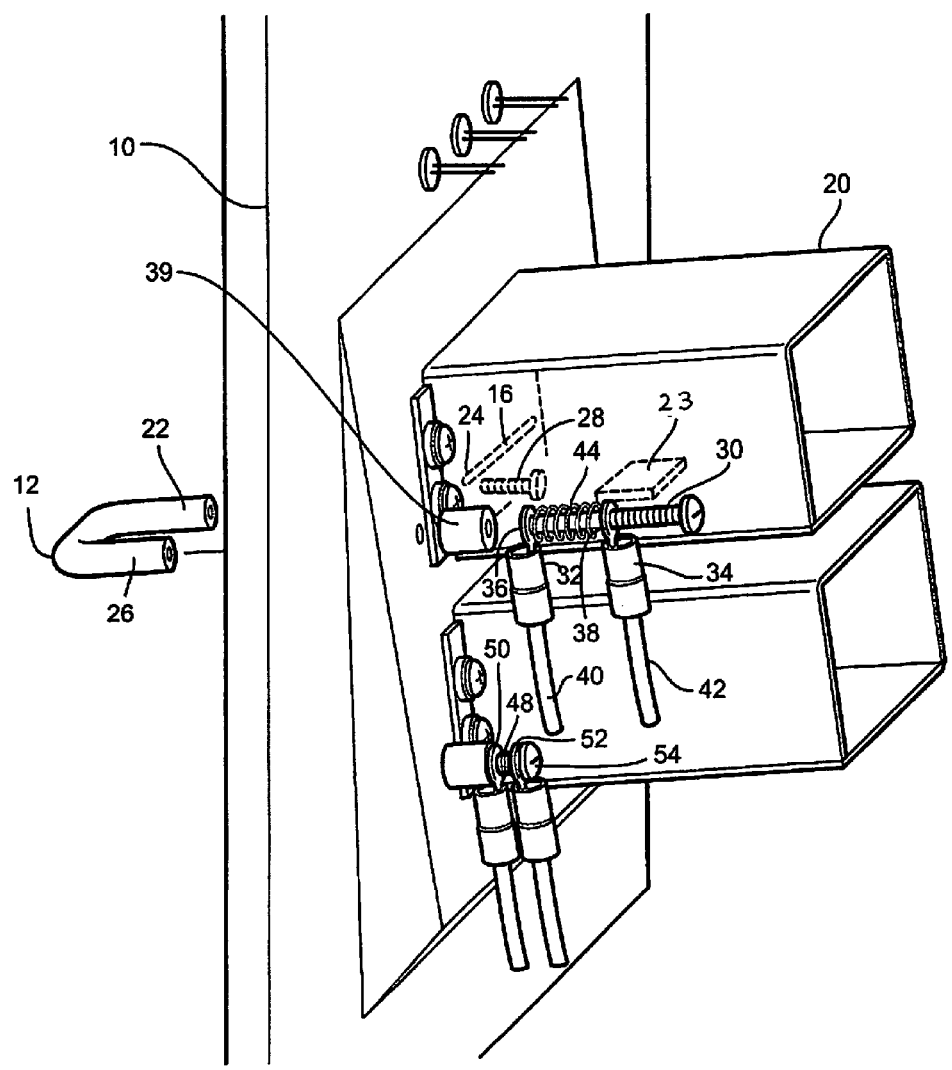
FIG. 2 is a partially exploded perspective view of an example of the anti-skimming displacement bar assembly for embodiments of the invention.
Figure 3:
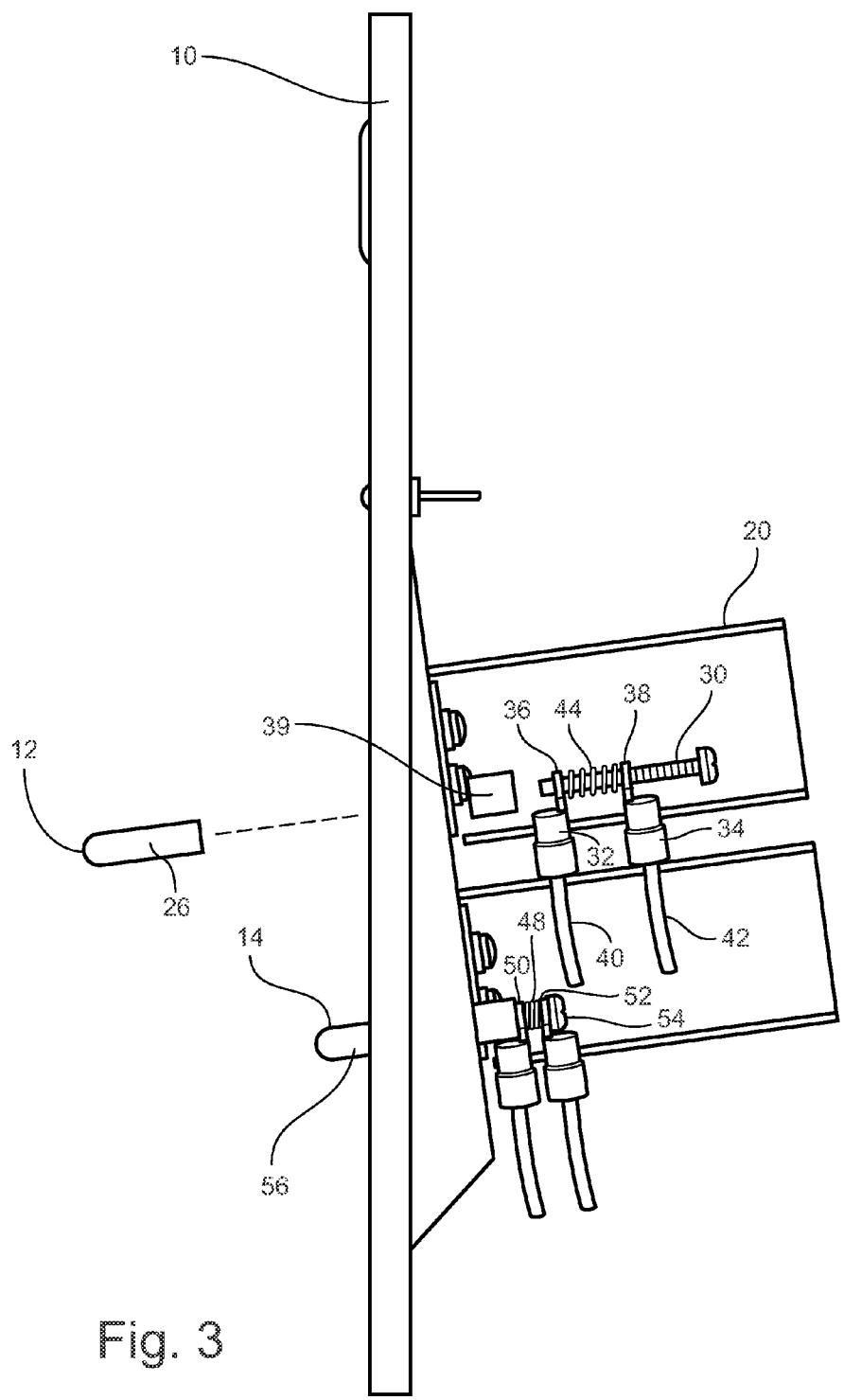
FIG. 3 is a partially exploded side elevational view of the anti-skimming displacement bar assembly shown in FIG. 2.

A key feature of embodiments of the invention is the particular location of the displacement bar 12 and/or 14 on the front panel 10 on an ATM or ACCR. FIG. 2 is a partially exploded perspective view of an example of the anti-skimming displacement bar assembly for embodiments of the invention. FIG. 3 is a partially exploded side elevational view of the anti-skimming displacement bar assembly shown in FIG. 2. Referring to FIG. 2, a displacement bar 12 may positioned on the front plate 10 with one of its two legs 22 directly aligned with a read head 23 of a card reader 20 inside a card entry opening 16 of the ATM or ACCR.

As illustrated in FIGS. 1 and 2, the displacement bar 12 may be mounted directly below and proximate an end 24 of the card entry opening 16 which is directly aligned with the read head 23 of the card reader 20 inside the card entry opening 16. Thus, in order for a criminal to successfully mount an overlay skimming device on the front plate 10, it would be necessary for the criminal to place the skimmer read head in the exact spot where the leg 22 of the displacement bar 12 is mounted. The particular location of the anti-skimming displacement bar 12 for embodiments of the invention on the front panel 10 makes that impossible.

The alignment and placement of the displacement bar 12 with one of its legs 22 proximate the card entry opening 16 is critical in keeping that area free of anything, such as a skimming head, that might be placed on the front plate 10. The reason such alignment and placement is critical is that when a cardholder inserts his or her magnetic stripe card into the card entry opening 16, the magnetic stripe of the magnetic stripe card passes directly over that particular area on its way to the read head 23 of the ATM or ACCR card reader 20 inside the ATM or ACCR.

Referring further to FIG. 2, in embodiments of the invention the displacement bar 12 may be made of a physically strong, non-breakable (i.e., infrangible) material, such as metal (e.g., steel). Further, at least a portion of each leg 22, 26 may define a cylinder, the inside walls of which are threaded to receive a correspondingly threaded shaft of a screw 28, 30, respectively. The leg 22 of the displacement bar 12 which is directly aligned with the read head 23 of the card reader 20 inside the card entry opening 16 of the front plate 10 of the ATM or ACCR may be attached to the front plate 10 by a screw 28 likewise made of a physically strong, non-breakable (i.e., infrangible) material, such as metal (e.g. steel), inserted through an opening in the front plate 10 and received in the internally threaded portion of the particular leg 22. The other leg 26 of the displacement bar 12 may be attached to the front plate 10 by a screw 30 made of a frangible, non-conductive material, such as nylon, inserted through another opening in the front plate 10 and received in a correspondingly internally threaded portion of the other leg 26.

Referring to FIGS. 2 and 3, in addition, two leads 32, 34 of an alarm cable circuit may be electrically connected to one another by passing the non-conducting screw 30 through the rings 36, 38 of a ring terminal connector on the end of each of a pair of alarm cables 40, 42 of the circuit. Further, a compression spring 44 may be provided between the two rings 36, 38 of the ring terminal connectors of alarm cables 40, 42 on the non-conducting screw 30. In addition, a non-conducting spacer 39 of a material, such as plastic, may also be provided on the non-conducting screw between the ring 36 and the face plate 10. As previously noted, for a criminal to successfully mount an overlay skimming device on the face plate 10 of the ATM or ACCR, it would be necessary to place the skimmer read head in the exact spot where the leg 22 of the displacement bar 12 that is fastened with the steel screw 28 is mounted. If order to do that, it would be necessary for the criminal to remove the displacement bar 12 by breaking or cutting both legs 22, 26 of the displacement bar 12 and removing the displacement bar 12.

Embodiments of the invention may utilize existing circuitry for monitoring the state of the displacement bar 12. This may be done by tapping into an existing sensor circuit of the ATM or ACCR card reader, for example, that detects and reports a jammed or non-working condition of the ATM or ACCR to a remote terminal which may be monitored. Embodiments of the invention may add the alarm cable circuit which can be broken, for example, if non-conducting nylon screw 30 is broken and the two ring connectors 36, 38 and compression spring 44 on the non-conducting screw 30 become separated.

If a criminal breaks or cuts the leg 22 of the displacement bar 12 that is fastened with the steel screw 28 to remove the displacement bar 12, the nylon screw 30 will also consequently be snapped or broken. In order to assure that contact between the two ring connectors 36, 38 is broken when the non-conducting nylon screw 30 is snapped or broken, the spring 44 is in a fully compressed state when the non-conducting screw 30 is received by and screwed tightly into the internally threaded opening in leg 22 of displacement bar 12.

Referring further to FIGS. 1, 2 and 3, a second displacement bar 14 proximate a second card entry opening 18 is illustrated in a mounting arrangement identical to the mounting arrangement of displacement bar 12 and with an identical compression spring 48. However, the compression spring 48 is shown in the compressed state between two terminal connector rings 50, 52 by a second non-conducting screw 54 likewise inserted through an opening in the front plate 10 and received in a correspondingly internally threaded portion of the a leg 56 of the second displacement bar 14, as shown in FIGS. 1 and 3.

Thus, when the non-conducting screw 30 is broken, the compressed spring 44 forcefully urges the two ring connectors 36, 38 apart from one another, and the force of the spring 44 may likewise urge at least one of the ring connectors 36, 38 apart from the spring 44 itself to assure that the alarm circuit is broken. When the alarm circuit is broken, a circuit is opened which may cause the ATM or ACCR card reader to be reported as jammed or non-working to the remote terminal that is monitored by a technician.

Typically, in order for a criminal to apply an overlay skimming device it is necessary for the criminal to remove one or both of the displacement bars 12, 14. Therefore, when an error signal is received regarding either or both card readers of an ACCR as being non-working, it may be assumed that a likely cause may be removal of either or both of the displacement bars 12, 14 by a criminal skimmer. When that occurs, security personnel may be sent to the ATM or ACCR or alternatively, the particular ATM or ACCR may be shut down remotely from the backend.

In an aspect of the invention, even if the terminal is not monitored remotely by a technician at the exact time that an error signal is received with regard to the ATM or ACCR, security personnel may determine from a time stamp the time at which the error signal was received within a certain period of time, such as a 12-hour period of time. Security personnel may then review video surveillance of the ATM or ACCR recorded within the 12-hour window to determine when the criminal skimmers were present at the ATM or ACCR site. Based on that determination, it may be possible to determine which bankcards were used while the criminal skimming was likely taking place and to take appropriate action with respect to those particular bankcards to prevent losses.

What is claimed is:

1. An anti-skimming assembly for a card reader device, comprising:
    a displacement bar mountable on a front plate of a card reader device proximate to a card entry opening formed in the front plate, said displacement bar having at least one leg;
    at least one fastener connectible to the at least one leg of the displacement bar through a fastener opening formed in the front plate, said at least one fastener being operatively coupleable to an alarm circuit, and said at least one fastener further comprising a non-conductive fastener connectible to the at least one leg through the fastener opening;
    first and second electrically conductive leads carried by said non-conductive fastener electrically connectible to one another via an electrically conductive spring and coupleable to said alarm circuit;
    said displacement bar having a second leg spaced from said at least one leg of the displacement bar;
    further comprising a second fastener connectible to the second leg of the displacement bar through a second fastener opening formed in the front plate, wherein said second fastener further comprises an infrangible fastener; and
    wherein said at least one fastener further comprises a frangible fastener, and wherein the frangible fastener comprises a non-metallic threaded screw receivable in an internally threaded opening formed in said at least one leg.

2. The anti-skimming assembly of claim 1, wherein the first and second electrically conductive leads comprise first and second ring terminal connectors of first and second cables, respectively, said first and second cables being operatively coupleable to the alarm circuit.

3. The anti-skimming assembly of claim 2, wherein the electrically conductive spring comprises an electrically conductive compression spring carried by the non-conductive frangible fastener between the first and second ring terminal connectors.

4. The anti-skimming assembly of claim 3, wherein the electrically conductive compression spring is carried by the non-conductive frangible fastener in a compressed condition between the first and second ring terminal connectors.

\* \* \* \* \*